US008706780B2

(12) United States Patent
Tokita et al.

(10) Patent No.: US 8,706,780 B2
(45) Date of Patent: Apr. 22, 2014

(54) CONTENT RECOMMENDATION DEVICE AND CONTENT RECOMMENDATION METHOD

(75) Inventors: Eiji Tokita, Kawasaki (JP); Satoshi Ozaki, Kawasaki (JP); Kenji Odaka, Yokohama (JP); Shirou Wakayama, Kawasaki (JP); Yoshiki Terashima, Yokoahama (JP); Kensaku Fujimoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 722 days.

(21) Appl. No.: 12/560,761

(22) Filed: Sep. 16, 2009

(65) Prior Publication Data

US 2010/0180203 A1 Jul. 15, 2010

(30) Foreign Application Priority Data

Jan. 13, 2009 (JP) ................. 2009-004972

(51) Int. Cl.
*G06F 7/00* (2006.01)
*G06F 17/30* (2006.01)

(52) U.S. Cl.
USPC ........... 707/812; 707/723; 707/732; 707/748; 707/749; 707/751

(58) Field of Classification Search
USPC ................. 707/736, 748, 749, 751, 723, 812
See application file for complete search history.

(56) References Cited

U.S. PATENT DOCUMENTS

| 7,237,264 | B1 * | 6/2007 | Graham et al. ................. 726/23 |
| 7,287,280 | B2 * | 10/2007 | Young ............................. 726/25 |
| 7,672,952 | B2 * | 3/2010 | Isaacson et al. ......... 707/999.01 |
| 7,703,119 | B2 * | 4/2010 | Kikinis et al. ................. 725/100 |
| 2008/0168533 | A1 | 7/2008 | Ozaki et al. |
| 2008/0219639 | A1 | 9/2008 | Terashima et al. |
| 2009/0234789 | A1 | 9/2009 | Odaka et al. |
| 2009/0244385 | A1 | 10/2009 | Wakayama et al. |
| 2009/0249425 | A1 | 10/2009 | Teramoto et al. |

FOREIGN PATENT DOCUMENTS

JP 2007-324874 12/2007

OTHER PUBLICATIONS

U.S. Appl. No. 12/561,808, filed Sep. 17, 2009, Fujimoto, et al.
U.S. Appl. No. 12/581,416, filed Oct. 19, 2009.
U.S. Appl. No. 12/545,556, filed Aug. 21, 2009.

* cited by examiner

*Primary Examiner* — Apu Mofiz
*Assistant Examiner* — Jared Bibbee
(74) *Attorney, Agent, or Firm* — Oblon, Spivak, McClelland & Neustadt, L.L.P.

(57) ABSTRACT

A content item recommendation device includes; a storage which stores information of a plurality of content items describing identifiers and usage characteristics of the resources used in the content items; a first specifying unit which specifies first content items which use at least S number of resources in common with a specified content item; a second specifying unit which specifies second content items which use at least K number of resources in common with each of the first content items; a calculator which calculates relationship levels between the specified content item and each of the second content items; a selector which selects recommended content items from the second content items based on the relationship levels.

13 Claims, 11 Drawing Sheets

| LAYERS OF RESOURCES TO BE USED | POINT VALUES |
|---|---|
| 0TH LAYER | 3 |
| 1ST LAYER | 2 |
| 2ND AND FOLLOWING LAYERS | 1 |

FIG. 10

| MATCHING LEVEL IN SCREEN EFFECTS | POINT VALUES |
|---|---|
| PERFECT MATCH | 2 |
| PARTIAL MATCH | 1 |
| NO MATCH | 0 |

(A) RELATIONSHIP LEVEL LIST

| CONTENT ITEMS | RELATIONSHIP LEVELS |
|---|---|
| NEWS PROGRAM A | 25 |
| NEWS PROGRAM B | 23 |
| SPORT PROGRAM A | 18 |
| SPORT PROGRAM B | 15 |
| EDUCATIONAL PROGRAM | 11 |
| MUSIC PROGRAM | 8 |
| COOKING PROGRAM | 7 |
| VARIETY PROGRAM | 6 |
| SHOPPING | 3 |
| TRAVEL PROGRAM | 1 |

(B) RECOMMENDED CONTENT ITEM LIST X

| CONTENT ITEMS | RELATIONSHIP LEVELS |
|---|---|
| NEWS PROGRAM A | 25 |
| NEWS PROGRAM B | 23 |
| SPORT PROGRAM A | 18 |
| SPORT PROGRAM B | 15 |
| EDUCATIONAL PROGRAM | 11 |

(C) RECOMMENDED CONTENT ITEM LIST Y

| CONTENT ITEMS | RELATIONSHIP LEVELS |
|---|---|
| NEWS PROGRAM A | 25 |
| NEWS PROGRAM B | 23 |
| SPORT PROGRAM A | 18 |

CONTENT RECOMMENDATION DEVICE AND CONTENT RECOMMENDATION METHOD

CROSS REFERENCE TO RELATED APPLICATIONS

This application is based upon and claims the benefit of priority from the prior Japanese Patent Application No. 2009-4972, filed on Jan. 13, 2009, the entire contents of which are incorporated herein by reference.

BACKGROUND OF THE INVENTION

1. Field of the Invention

The present invention relates to a content item recommendation device and a content item recommendation method for detecting content items highly related to the content item being viewed by a user and recommending the content items to the user, for example.

2. Related Art

In recent years, the number of channels of digital broadcasting such as CATV and CS broadcasting has been increasing and the variety of the content items viewable for a user has been considerably increasing. In such a trend, services for generating content items by using the resources on the Internet are provided. Accordingly, the user is required to select a content item to his/her liking from enormous number of content items provided through these services.

However, the increase in the number of selectable content items in these services makes it complicated or difficult for the user to select the content item to his/her liking. Accordingly, attention is focused on systems for helping the user to select the content item by recommending content items. There is a technique in which the viewing history of the user is used to recommend content items. In this technique, the user viewing a content item is recommended to other content items based on the searched viewing histories of the other users which have viewed the same content item (see JP-A 2007-324874 (Kokai)).

As stated above, attention is focused on the techniques for recommending content items, and there is a technique for recommending content items by using the viewing histories of the users. However, in such a conventional technique using the viewing histories, recommendation cannot be made when the viewing histories are not sufficiently accumulated. Therefore, it is difficult to let the user select a content item to his/her liking when the operation of a service for distributing content items is in an initial stage and no or few viewing histories are accumulated.

SUMMARY OF THE INVENTION

According to an aspect of the present invention, there is provided with a content item recommendation device comprising: a storage configured to store information relating to a plurality of content items each of which is reproduced based on a plurality of resources, the information describing identifiers and usage characteristics of the resources used in the content items; a receiver configured to receive an identifier of a specified content item; a first specifying unit configured to specify, based on the storage, first content items each of which uses at least S number (S is an integer of 1 or more) of resources in common with the specified content item; a second specifying unit configured to specify, based on the storage, second content items each of which uses at least K number (K is an integer of 1 or more) of resources in common with one of the first content items, the second content items being specified from remaining content items except the specified content item and the first content items from the content items; a relationship level calculator configured to calculate relationship levels between the specified content item and each of the second content items based on usage characteristics of target resources used in each of the second content items, the target resources being all resources used in common with one or a plurality of the first content items which use the at least K number of resources commonly with each of the second content items; a selector configured to select recommended content items from among the second content items based on the relationship levels of the second content items; and an output unit configured to output a list of the recommended content items.

According to an aspect of the present invention, there is provided with a content item recommendation method executed by a computer, comprising: accessing a content item information storage which stores information relating to a plurality of content items each of which is reproduced by using a plurality of resources, the information describing identifiers and usage characteristics of the resources used in the content items; receiving an identifier of a specified content item; specifying first content items each of which uses at least S number (S is an integer of 1 or more) of resources in common with the specified content item; specifying second content items each of which uses at least K number (K is an integer of 1 or more) of resources in common with one of the first content items, the second content items being specified from remaining content items except the specified content item and the first content items from the content items; calculating relationship levels between the specified content item and each of the second content items based on usage characteristics of target resources used in each of the second content items, the target resources being all resources used in common with one or a plurality of the first content items which use the at least K number of resources commonly with each of the second content items; selecting recommended content items from among the second content items based on the relationship levels of the second content items; and outputting a list of the recommended content items.

DETAILED DESCRIPTION OF THE INVENTION

Embodiments according to the present invention will now be explained with reference to the accompanying drawings.

Figure 1:
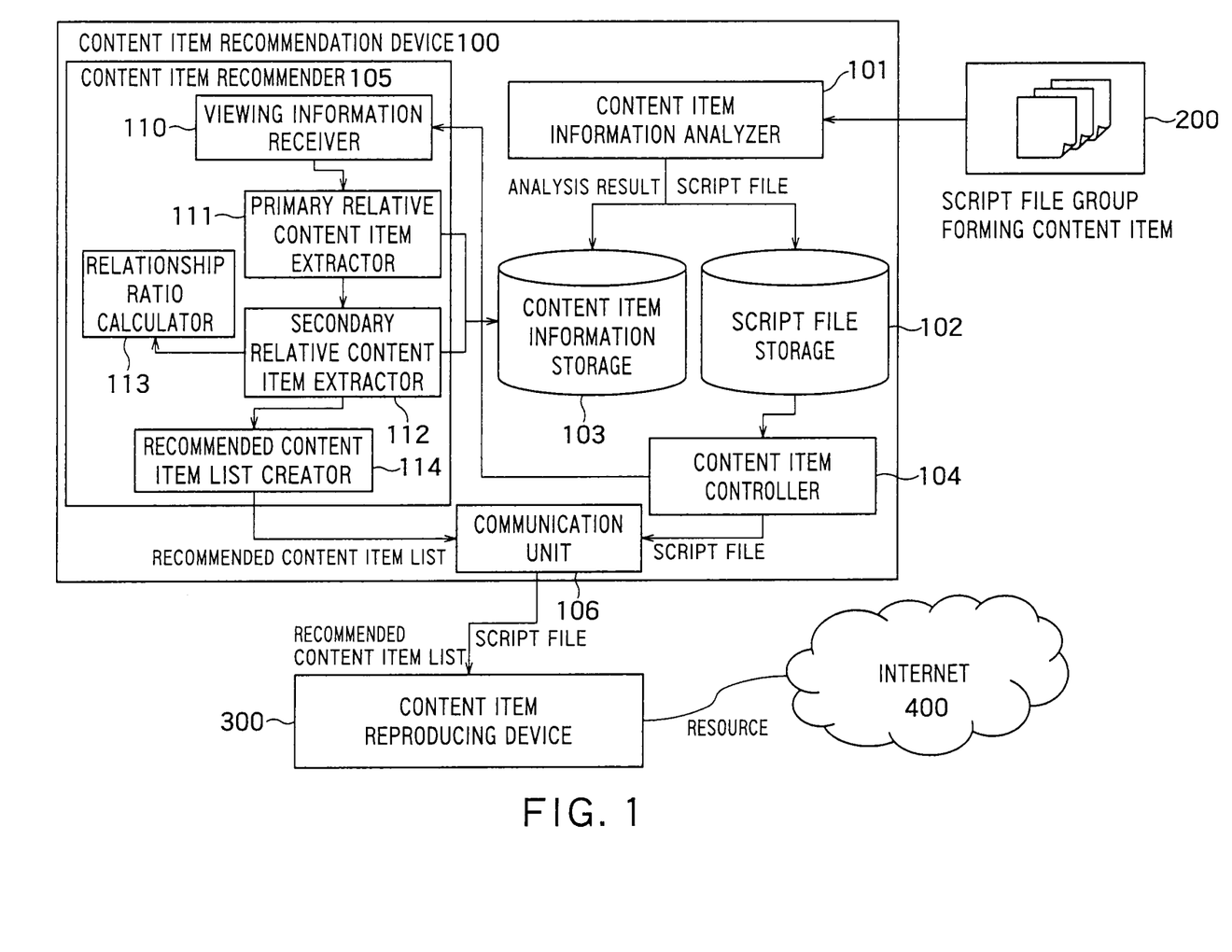
FIG. 1 is a block diagram showing the structure of a content item recommendation device according to a first embodiment.

FIG. 1 is a block diagram showing the structure of a content distribution system including a content item recommendation device according to a first embodiment of the present invention.

A content item recommendation device 100 is arranged on a network such as an Internet 400 and is connected, through the network, to a content item reproducing device 300 operated by a user. The content item recommendation device 100 acquires the content items to be recommended to a user by detecting content items highly related to the content item currently being viewed by the user through the content item reproducing device 300, and creates a recommended content item list to be transmitted to the content item reproducing device 300. The content item reproducing device 300 displays the recommended content item list on a screen, and the user selects a content item from the recommended content item list according to his/her need and views the selected content item. Hereinafter, the content item recommendation device 100 will be explained in detail.

The content item recommendation device 100 includes: a content item information analyzer 101; a script file storage 102; a content item information storage (a storage) 103; a content item controller 104; a content item recommender 105; and a communication unit 106.

The content item information analyzer 101 receives a registration of a content item input by the creator of the content item through an input unit (not shown). The content item is formed of: a script file group (script files) 200 describing the ways to reproduce a plurality of resources; and the resources each of which is referred to by the script files (the script file group) 200. The resources are stored in a server arranged on the Internet 400. Each resource is reproduced by executing the script file group 200, by which the content item is reproduced. Each script file describes additional information such as the source (URL or URI, for example) of the resource used in the content item, the way to draw the resource, the arrangement position of the resource in the screen, and screen effects applied to the resource (fade-in, fade-out, movement (rotation etc.) in the screen, lighting, etc.) Further, the script file group 200 has a layer structure in which a script file of an upper layer can internally call a script file of a lower layer as a child script file. In this layer structure, the depth of the layer is not particularly limited to a fixed value.

The content item information analyzer 101 receives from the user a registration request of the content item and the script file group 200 forming the content item, by which the registration of the content item is received. When receiving these information items, the content item information analyzer 101 transmits, to the content item information storage 103, content item information acquired by analyzing the substance of the script file group 200, and transmits the received script file group 200 to the script file storage 102.

The content item information obtained by analyzing the script file group 200 retains the following information items, for example.

1. The source URL on the Internet of the resource used in the content item (the identifier of the resource)

2. The layer level of the script file using the resource (usage characteristic of the resource)

3. The value of each screen effect applied to the resource (usage characteristic of the resource)

In addition to the above information items, other information items such as the title, creator, summary, etc. of the content item can be included in the content item information.

The script file storage 102 stores therein the script file group 200 transmitted from the content item information analyzer 101. Further, the script file storage 102 provides the content item controller 104 with a specified script file group in accordance with a request from the content item controller 104.

The content item information storage 103 stores the content item information transmitted from the content item information analyzer 101. Further, the content item information storage 103 provides the content item recommender 105 with specified content item information in accordance with a request from the content item recommender 105.

The communication unit 106 communicates with the content item reproducing device 300 for reproducing the content item through the Internet 400 or another network. When the user selects a content item he/she wants to view in the content item reproducing device 300, the identification information of the viewing content item (viewing content item identifying information) is transmitted to the content item recommendation device 100 through the network. The communication unit 106 receives this viewing content item identifying information and transmits it to the content item controller 104.

The content item controller 104 receives the viewing content item identifying information from the communication unit 106, acquires from the script file storage 102 the script file group 200 corresponding to the viewing content item identifying information, and transmits the acquired script file group 200 to the content item reproducing device 300 through the communication unit 106. At the same time, the content item controller 104 transmits the viewing content item identifying information to the content item recommender 105.

When receiving, from the content item recommendation device 100, the script file group 200 corresponding to the viewing content item identifying information, the content item reproducing device 300 acquires through the Internet 400 the resources required to reproduce the content item based on the substance of the received script file group 200, and reproduces the resources in accordance with the instructions by the script file group 200, by which the content item is reproduced. Note that when reproducing the content item, the content item can be displayed on the screen in combination with sound instead of being merely displayed on the screen.

The content item recommender 105 receives the viewing content item identifying information from the content item controller 104, selects content items highly related to the viewing content item currently being viewed by the user in order to recommend the selected content items to the user as recommended content items, and transmits the recommended content item list to the content item reproducing device 300 through the communication unit 106. The content item reproducing device 300 receives the recommended content item list and displays the recommended content item list on the screen. In this way, the recommended content item list is presented to the user. Accordingly, the user can select a content item from the recommended content item list according to his/her need and view the selected content item.

The content item recommender 105 structured as stated above includes: a viewing information receiver 110; a primary relative content item extractor 111; a secondary relative content item extractor 112; a relationship level calculator 113; and a recommended content item list creator 114.

The viewing information receiver (content item receiver) 110 receives, from the content item controller 104, the identification information (viewing content item identifying information) of the content item currently being viewed, and transmits the received information to the primary relative content item extractor 111.

The primary relative content item extractor (first specifying unit) 111 receives the viewing content item identifying information from the viewing information receiver 110, and specifies, by using the content item information storage 103, primary relative content items each of which uses at least one resource in common with the viewing content item. Although this case is based on the condition that at least one resource is common, it is also possible to set a condition that at least S (S is an integer of 1 or more) number of resources are common (the following explanation is based on the condition that at least one resource is common). The primary relative content item extractor 111 transmits a list of the specified primary relative content items (that is, identification information of the primary relative content items) to the secondary relative content item extractor 112 and the recommended content item list creator 114.

The secondary relative content item extractor (second specifying unit) 112 receives the list of the primary relative content items acquired by the primary relative content item extractor 111, and specifies, by using the content item information storage 103, secondary relative content items each of which uses at least one resource in common with each of the primary relative content items, the secondary relative content items being specified from the registered content items excluding the primary relative content items in the list and the viewing content item. That is, the secondary relative content items are different from the primary relative content items in the list and uses the resources which are included in the primary relative content items but are not included in the viewing content item. Although this case is based on the condition that at least one resource is common, it is also possible to set a condition that at least K (K is an integer of 1 or more) number of resources are common (the following explanation is based on the condition that at least one resource is common). The secondary relative content item extractor 112 transmits a list of the specified secondary relative content items (that is, identification information of the secondary relative content items) to the recommended content item list creator 114.

The recommended content item list creator (selector, output unit) 114 receives the list of the secondary relative content items from the secondary relative content item extractor 112, and receives the list of the primary relative content items from the primary relative content item extractor 111. Then, the relationship levels of each secondary relative content items with respect to the viewing content item are calculated based on the usage characteristics of a target resource in each second secondary relative content item, the target resource being a resource used commonly with the primary relative content item using at least one resource in common with each secondary relative content item (the usage characteristics are the layer level, the value of the screen effect, etc. Usage characteristics other than these characteristics can also be defined and used). The relationship level can be calculated by further using the usage characteristics of the above target resource in the primary relative content item. The relationship level is calculated by using the relationship level calculator 113, and how to calculate the relationship level will be explained in detail later.

After acquiring the relationship level with the viewing content item for each secondary relative content item, the recommended content item list creator 114 selects the content items (recommended content items) to be recommended to the user currently in a viewing state based on each relationship level, and creates a recommended content item list. The recommended content item list creator 114 transmits the created recommended content item list to the content item reproducing device 300 through the communication unit 106.

As understood from the above explanation, the recommended content items include the resources none (or only a few) of which are in common with the viewing content item. In this way, in the present embodiment, content items highly related to the viewing content item are selected as the recommended content items from the content items including the resources none (or only a few) of which are in common with the viewing content item to present the recommended content items to the user. As stated above, content items highly related to the viewing content item are recommended to the user while preventing the resources of the content items to be recommended from overlapping with the resources of the viewing content item as much as possible.

Figure 2:
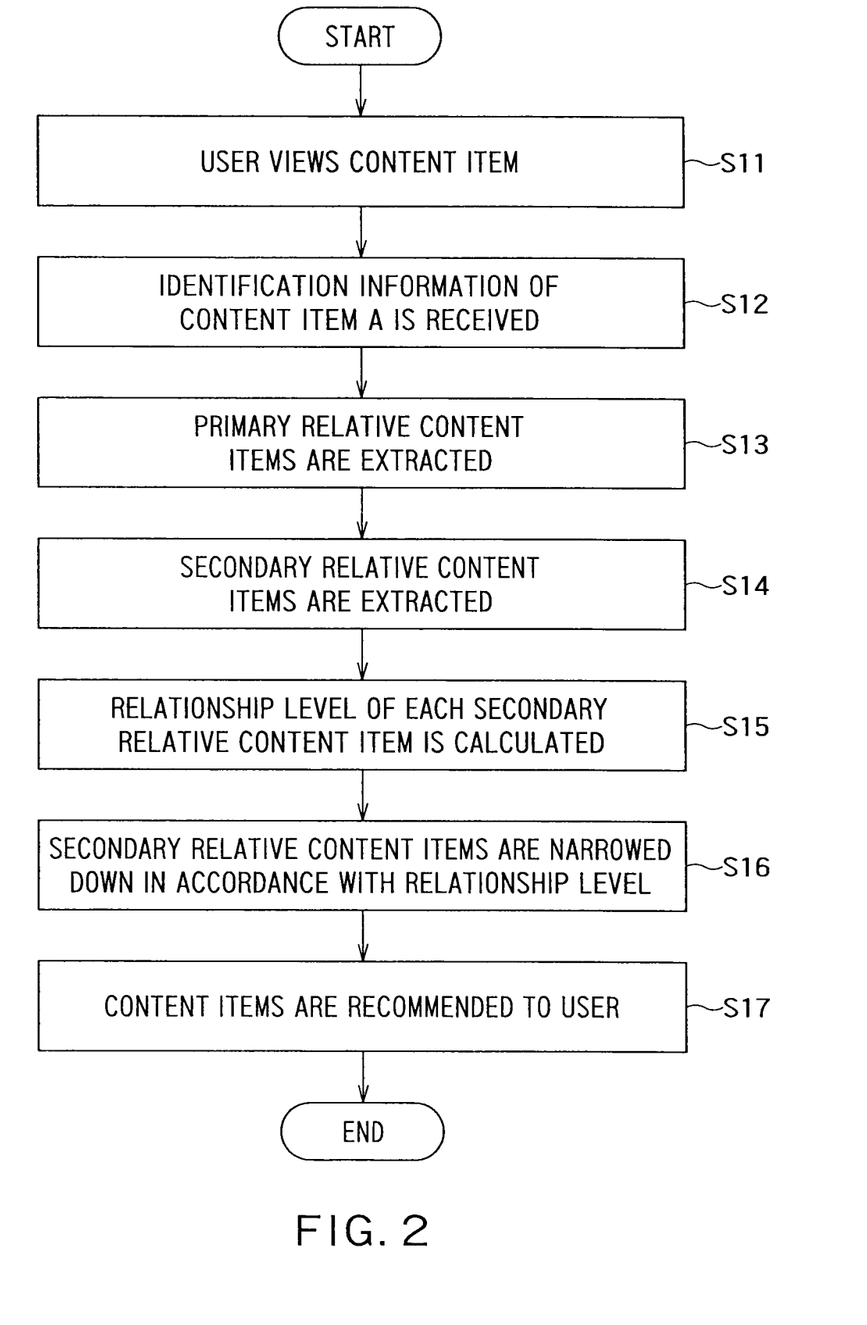
FIG. 2 is a flow chart showing the overall operation according to the first embodiment.

FIG. 2 is a flow chart showing an example of the overall operation performed by the content item recommendation device of FIG. 1.

When the user selects an arbitrary content item A (viewing content item), the identification information (viewing content item identifying information) of the content item A is transmitted from the content item reproducing device 300 to the communication unit 106 of the content item recommendation device 100. This identification information is transmitted from the communication unit 106 to the content item controller 104, and the content item controller 104 acquires, from the script file storage 102, the script file group 200 of the content item A specified by this identification information and transmits the script file group 200 to the content item reproducing device 300 through the communication unit 106. In this way, the content item A is viewed through the content item reproducing device 300 (S11). At this time, the content item controller 104 transmits the identification information (information showing that the content item A is viewed by the user) of the content item A to the viewing information receiver 110 of the content item recommender 105 (S12).

Figure 3:
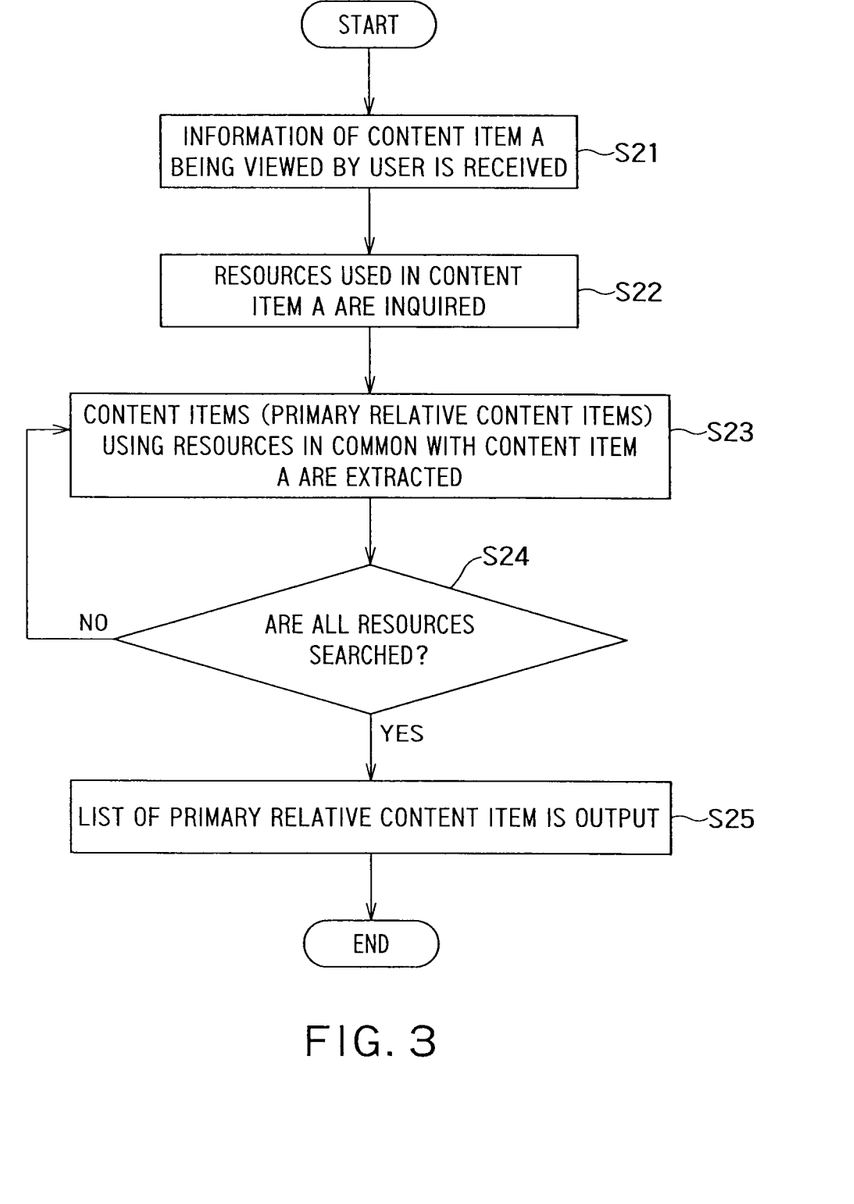
FIG. 3 is a flow chart showing the operation for extracting primary relative content items according to the first embodiment.

The viewing information receiver 110 receives the identification information of the content item A and transmits the received identification information to the primary relative content item extractor 111. The primary relative content item extractor 111 receives the identification information of the content item A, and specifies the primary relative content items, each of which uses at least one resource in common with the content item A, by using the content item information storage 103 (S12 and S13). The primary relative content item extractor 111 transmits a list of the specified primary relative content items to the secondary relative content item extractor 112 and the recommended content item list creator 114. FIG. 3 is a flow chart showing the detailed operation of the primary relative content item extractor 111.

As shown in FIG. 3, the primary relative content item extractor 111 receives the identification information of the content item A from the viewing information receiver 110 (S21), and transmits an inquiry to the content item information storage 103 to acquire the resources used in the content item A (S22). After that, the primary relative content item extractor 111 transmits an inquiry to the content item information storage 103 to extract the primary relative content items using the resources which are in common with the content item A (S23), and this step is performed on every resource included in the content item A (S24). Then, a list of the extracted primary relative content items is created and output (S25). The created list is transmitted to the secondary relative content item extractor 112 and the recommended content item list creator 114. The primary relative content items can be extracted by transmitting an inquiry to the content item information storage 103 as in this example, or by letting the primary relative content item extractor 111 read content item information from the content item information storage 103 so that the primary relative content items are extracted by the primary relative content item extractor 111 based on the read content item information.

Figure 7:
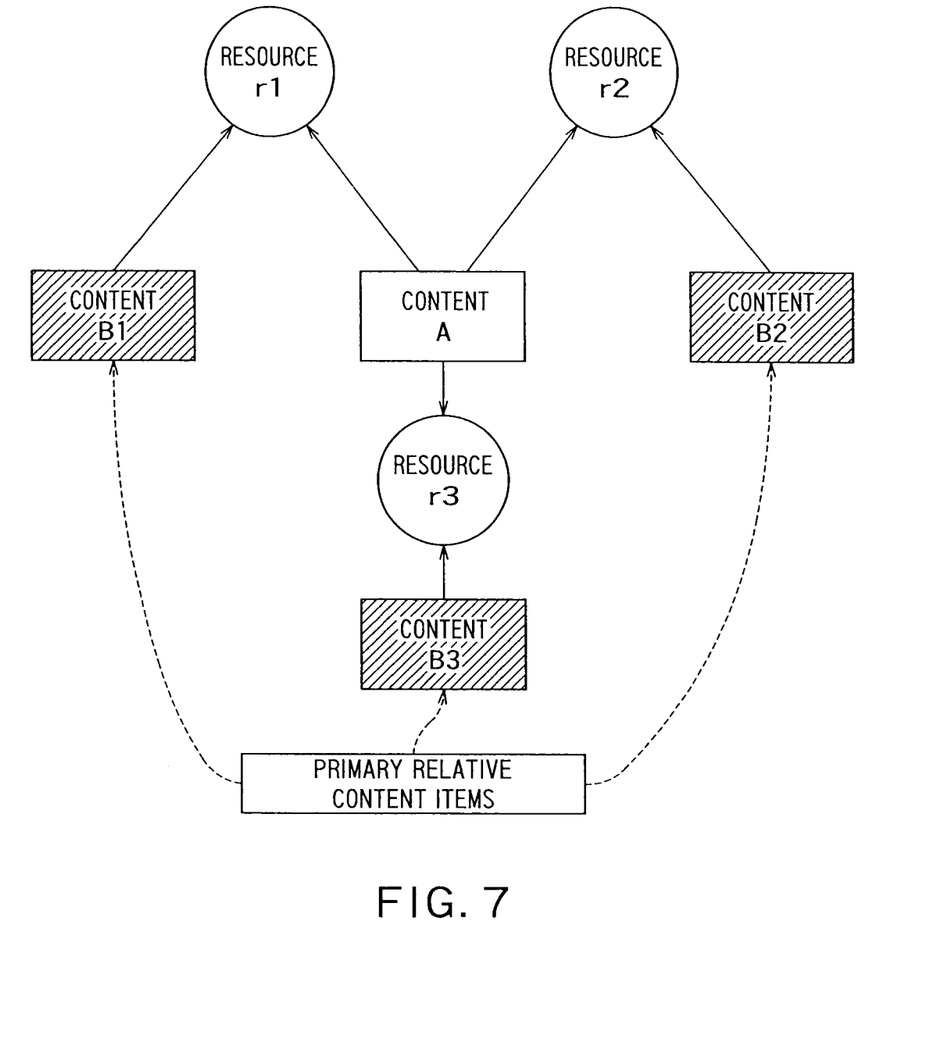
FIG. 7 is a diagram showing an example for extracting the primary relative content items according to the first embodiment.

Hereinafter, a concrete example of how to extract the primary relative content items will be explained using FIG. 7. The content item A is currently being viewed. The script files of the content item A refer to resources r1, r2, and r3 on the Internet 400 respectively. The primary relative content item extractor 111 accesses the content item information storage 103 to search the content items referring to the resources r1 to r3. Assume that a content item B1 referring to the resource r1, a content item B2 referring to the resource r2, and a content item B3 referring to the resource r3 are found as a search result. In this case, the content items B1 to B3, which are connected to the content item A through the resources r1 to r3 respectively, are extracted as the primary relative content items of the content item A. The resources r1 to r3 are used in common between the content item A and the primary relative content items.

Figure 4:
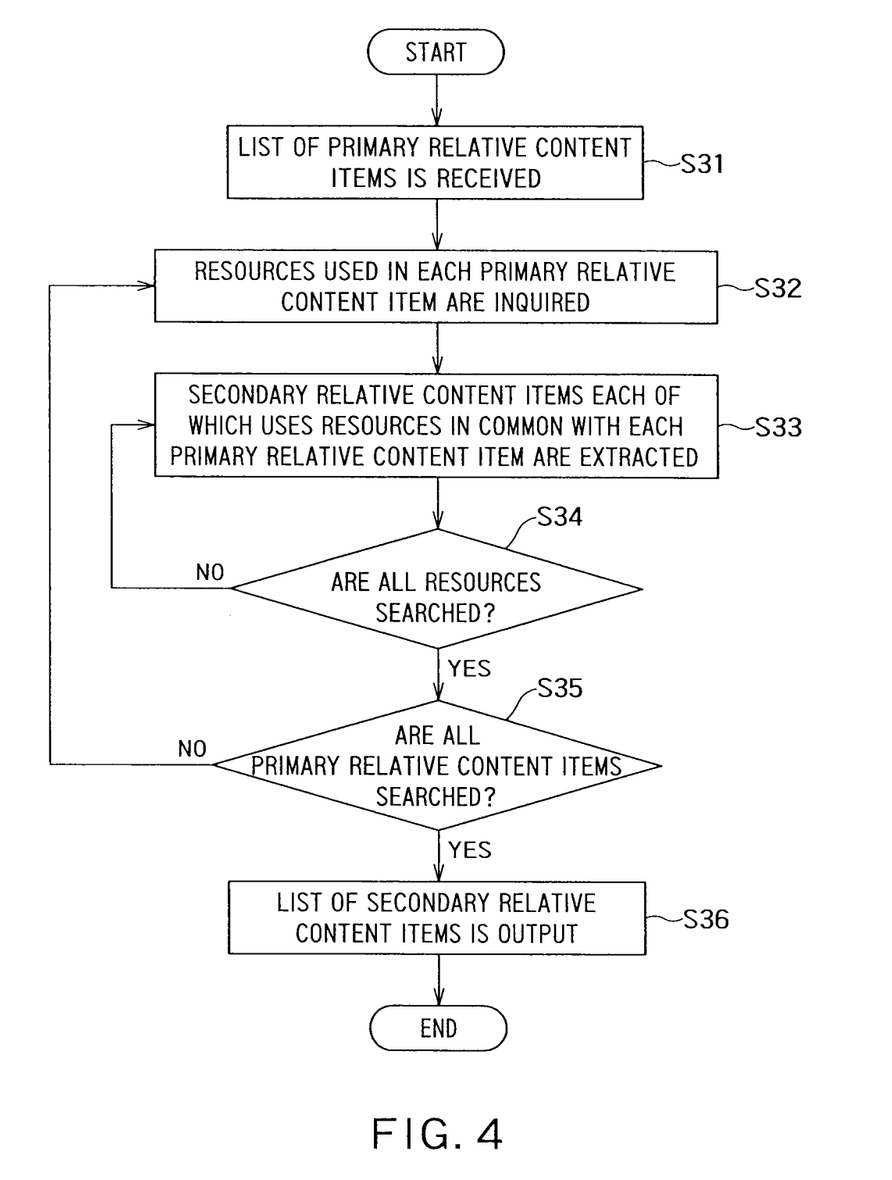
FIG. 4 is a flow chart showing the operation for extracting secondary relative content items according to the first embodiment.

After that, the secondary relative content item extractor 112 receives the list of the primary relative content items, transmits an inquiry to the content item information storage 103 to specify the secondary relative content items, which are different from the primary relative content items in the list and use the resources which are included in the primary relative content items but are not included in the viewing content item (S14 in FIG. 2), and transmits a list of the specified secondary relative content items to the recommended content item list creator 114. FIG. 4 is a flow chart showing the detailed operation of the secondary relative content item extractor 112.

As shown in FIG. 4, the secondary relative content item extractor 112 receives the list of the primary relative content items from the primary relative content item extractor 111 (S31), selects one of the primary relative content items, and inquires of the content item information storage 103 about the resources used in the primary relative content item (S32). Next, the secondary relative content item extractor 112 transmits an inquiry to the content item information storage 103 to extract the secondary relative content items each of which uses at least one resource in common with the selected primary relative content item from the content items excluding the content item A and the primary relative content items (S33 and S34). The above steps are performed on every primary relative content item (S35), by which a list of the secondary relative content items is created (S36) and is transmitted to the recommended content item list creator 114. As understood from the above explanation, the resources included in the secondary relative content items are completely different from those included in the content item A.

Figure 8:
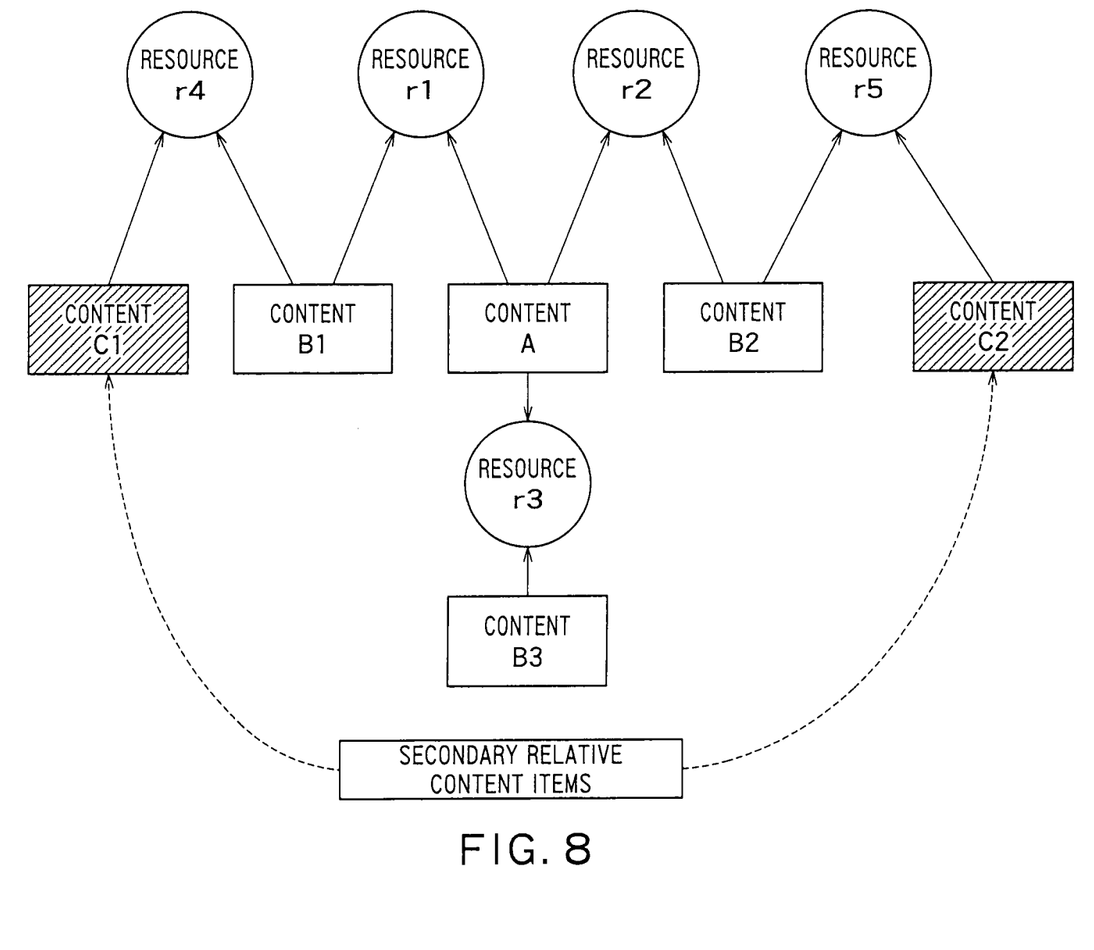
FIG. 8 is a diagram showing an example for extracting the secondary relative content items according to the first embodiment.

Hereinafter, a concrete example of how to extract the secondary relative content items will be explained using FIG. 8. The content item A is currently being viewed by the user, and the content items B1 to B3 are the primary relative content items of the content item A. The resource r1 is referred to by the content item A and the primary relative content item B1. The resource r2 is referred to by the content item A and the primary relative content item B2. The resource r3 is referred to by the content item A and the primary relative content item B3. A resource r4 is referred to by the primary relative content item B1. A resource r5 is referred to by the primary relative content item B2.

With the above structure, the secondary relative content item extractor 112 accesses the content item information storage 103 to search the content items (excluding the primary relative content items) referring to the resources r4 and r5, which are not referred to by the content item A, from the resources referred to by the content items B1 to B3. Assume that a content item C1 referring to the resource r4 and a content item C2 referring to the resource r5 are found as a search result. In this case, the content items C1 and C2 are extracted as the secondary relative content items of the content item A.

Figure 5:
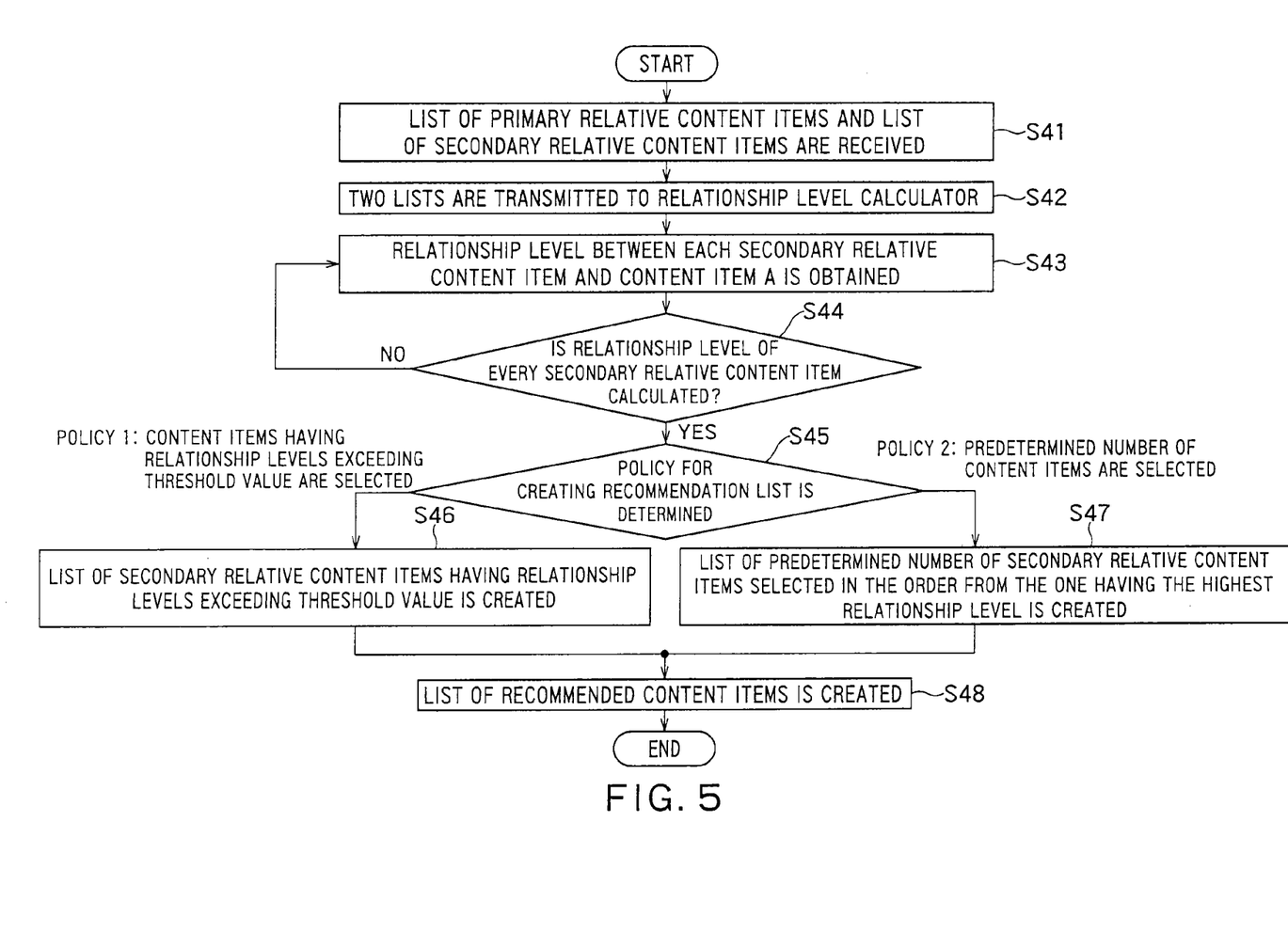
FIG. 5 is a flow chart showing the operation for making a recommended content item list according to the first embodiment.

Next, the recommended content item list creator 114 receives the list of the secondary relative content items and the list of the primary relative content items, and obtains the relationship level of each secondary relative content item with the content item A by using the relationship level calculator 113 (S15 in FIG. 2). Then, the recommended content item list creator 114 selects the secondary relative content items to be recommended to the user based on the relationship levels, and creates a list of the selected secondary relative content items serving as the recommended content items (S16). The created recommended content item list is transmitted to the content item reproducing device 300 through the communication unit 106, by which the content items are recommended to the user (S17). FIG. 5 is a flow chart showing the detailed operation of the recommended content item list creator 114.

As shown in FIG. 5, the recommended content item list creator 114 receives the list of the primary relative content items from the primary relative content item extractor 111 and the list of the secondary relative content items from the secondary relative content item extractor 112 (S41), and transmits these two lists and the content item information of the primary relative content items and the secondary relative content items to the relationship level calculator 113 (S42). The relationship level calculator 113 calculates the relationship level of each secondary relative content item with the content item A based on the two lists and content item information received from the recommended content item list creator 114, and returns the result to the recommended content item list creator 114 (S43 and S44). The recommended content item list creator 114 selects the secondary relative content items each of which has a relationship level which is equal to or greater than a predetermined threshold value (policy 1 of S45 and S46), or selects a predetermined number of secondary relative content items in the order from the one having the highest relationship level (policy 2 of S45 and S47). Then, the recommended content item list creator 114 generates a list of the selected secondary relative content items serving as the recommended content items (S48).

Figure 6:
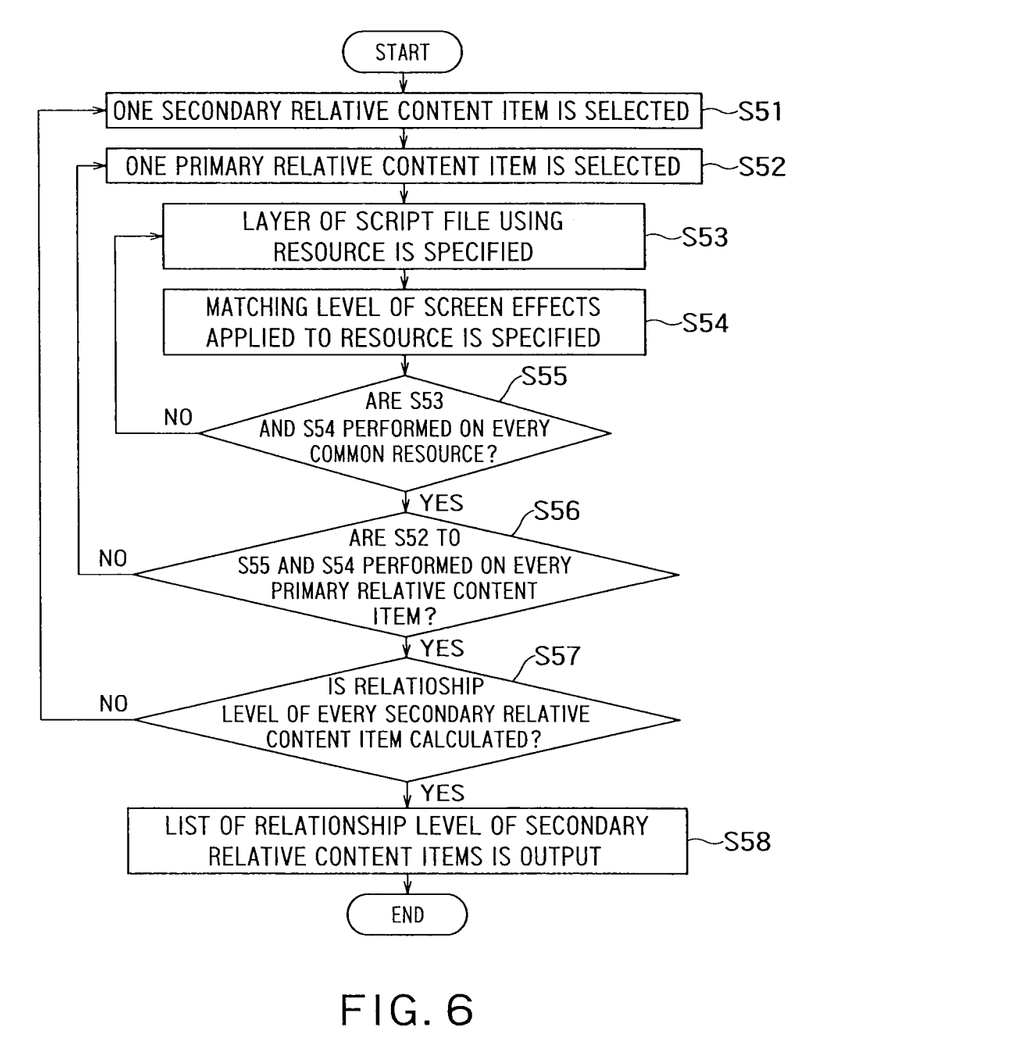
FIG. 6 is a flow chart showing the operation for calculating the relationship level between the content items according to the first embodiment.

FIG. 6 is a flow chart showing how the relationship level is calculated by the relationship level calculator 113 in step S43 of FIG. 5.

First, the relationship level calculator 113 selects one secondary relative content item (S51), and selects one primary relative content item using at least one resource (target resource) in common with the selected secondary relative content item (S52). Then, the layer level of the target resource used in the selected secondary relative content item is specified (S53). Further, with respect to the target resource, the matching ratio in screen effects between the selected secondary relative content item and the selected primary relative content item is specified (S54). Steps S53 and S54 are performed on every target resource used in common in the selected secondary relative content item and primary relative content item (S55), and steps S52 to S55 are performed on every primary relative content item using the resource (at least one resource in this case) in common with the selected secondary relative content item (S56). Based on the results obtained through the above steps, the relationship level of the selected secondary relative content item is calculated (S57). When the relationship level of every secondary relative content item included in the list is calculated, a list of the relationship ratios is transmitted to the recommended content item list creator 114 (S58).

In step S57, the relationship level is calculated in accordance with the following standards, for example.

<Standards for Calculating the Relationship Level>

(1) The Layer of the Script File Using the Resource (Target Resource)

As the layer of the script file using the resource becomes higher, the influence becomes greater. Further, as the layer of the script file using the resource becomes higher, the relationship level between the content items (here, the secondary relative content item and the content item A) becomes higher.

(2) Screen Effects Applied to the Resource to be Used (Target Resource)

When the resource is reproduced by the content item reproducing device, screen effects are applied in accordance with the script files. When the matching ratio, in the screen effects applied to the resource, between the secondary relative content item and the primary relative content item is high, the relationship level between the content items (the secondary relative content item and the content item A) is high. Here, the matching ratio is determined to be "perfect match" when every effect is in a match state, "no match" when no effect is in the match state, and to be "partial match" when a part of effects are in the match state, for example.

(3) The Number of Resources (Target Resources) Used in Common in the Second Relative Content Item and the Primary Relative Content Item With respect to every target resource, by summing up the contribution values of the relationship level calculated based on the above standards (1) and (2), the relationship level is calculated.

Hereinafter, a concrete example of how to calculate the relationship level will be explained using FIG. 9. Here, tables of FIG. 10 and FIG. 11 are provided corresponding to the above standards (1) and (2), respectively.

Figure 9:
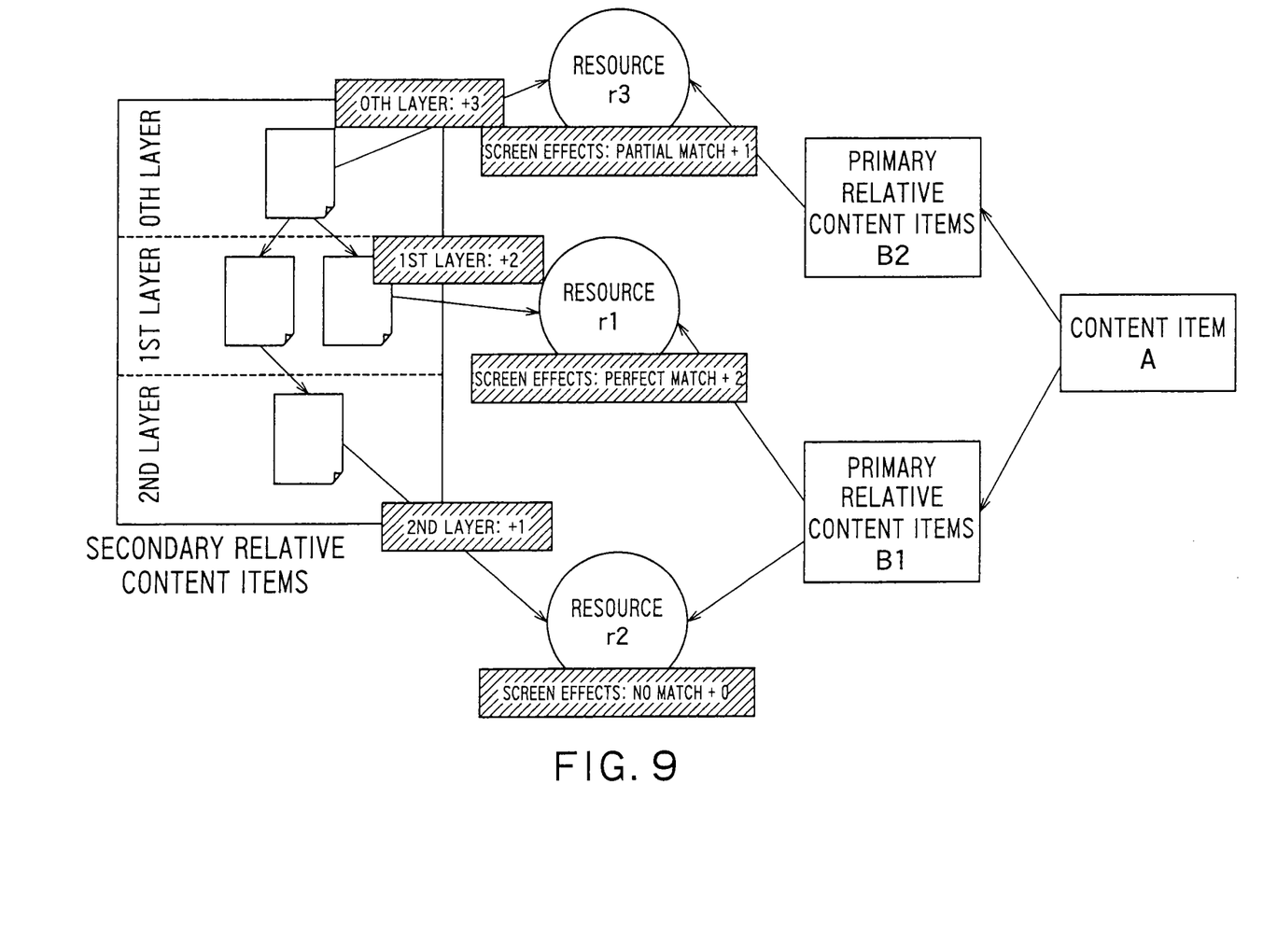
FIG. 9 is a diagram explaining an example for calculating the relationship level of the secondary relative content item according to the first embodiment.

FIG. 9 shows the content item A currently being viewed, the primary relative content items B1 and B2 of the content item A, and the secondary relative content item C. Further, the primary relative content item B1 and the secondary relative content item C are coupled to each other through the resources r1 and r2 (target resources), and the primary relative content item B2 and the secondary relative content item C are coupled to each other through the resource r3 (target resource).

Figure 10:
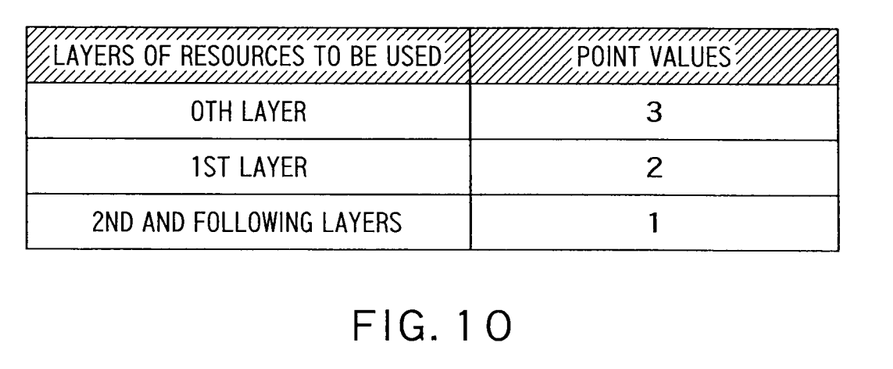
FIG. 10 is a table relating the layers of resources to point values according to the first embodiment.
Figure 11:
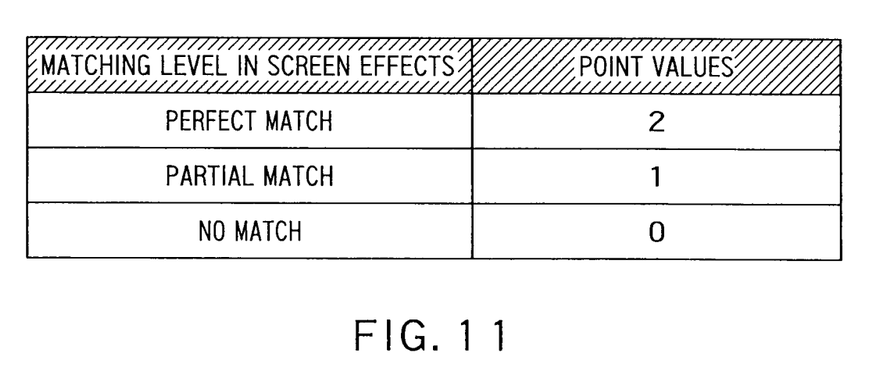
FIG. 11 is a table relating the matching ratios of screen effects to point values according to the first embodiment.

Referring to the table of FIG. 10, the resource r1 has the point value (contribution value) of "+2" since the resource r1 is used in the first layer of the secondary relative content item C, and further has the point value of "+2" since the screen effects of the secondary relative content item C and those of the primary relative content item B1 completely match with each other. Accordingly, the total point value of the resource r1 is 4. The resource r2 has the point value of "+1" since the resource r2 is used in the second layer of the secondary relative content item C, and further has the point value of "+0" since the screen effects of the secondary relative content item C and those of the primary relative content item B1 do not match with each other at all. Accordingly, the total point value of the resource r2 is 1. The resource r3 has the point value of "+3" since the resource r3 is used in the 0th layer of the secondary relative content item C, and further has the point value of "+1" since the screen effects of the secondary relative content item C and those of the primary relative content item B2 partially match with each other. Accordingly, the total point value of the resource r3 is 4. Therefore, the relationship level of the content item C with respect to the content item A is totally 9 (=4+1+4) points. In this case, although the point value of "+1" is equally applied when the screen effects are partially matched, the point value can be changed in accordance with the number or ratio of the matched effects.

Figure 12:
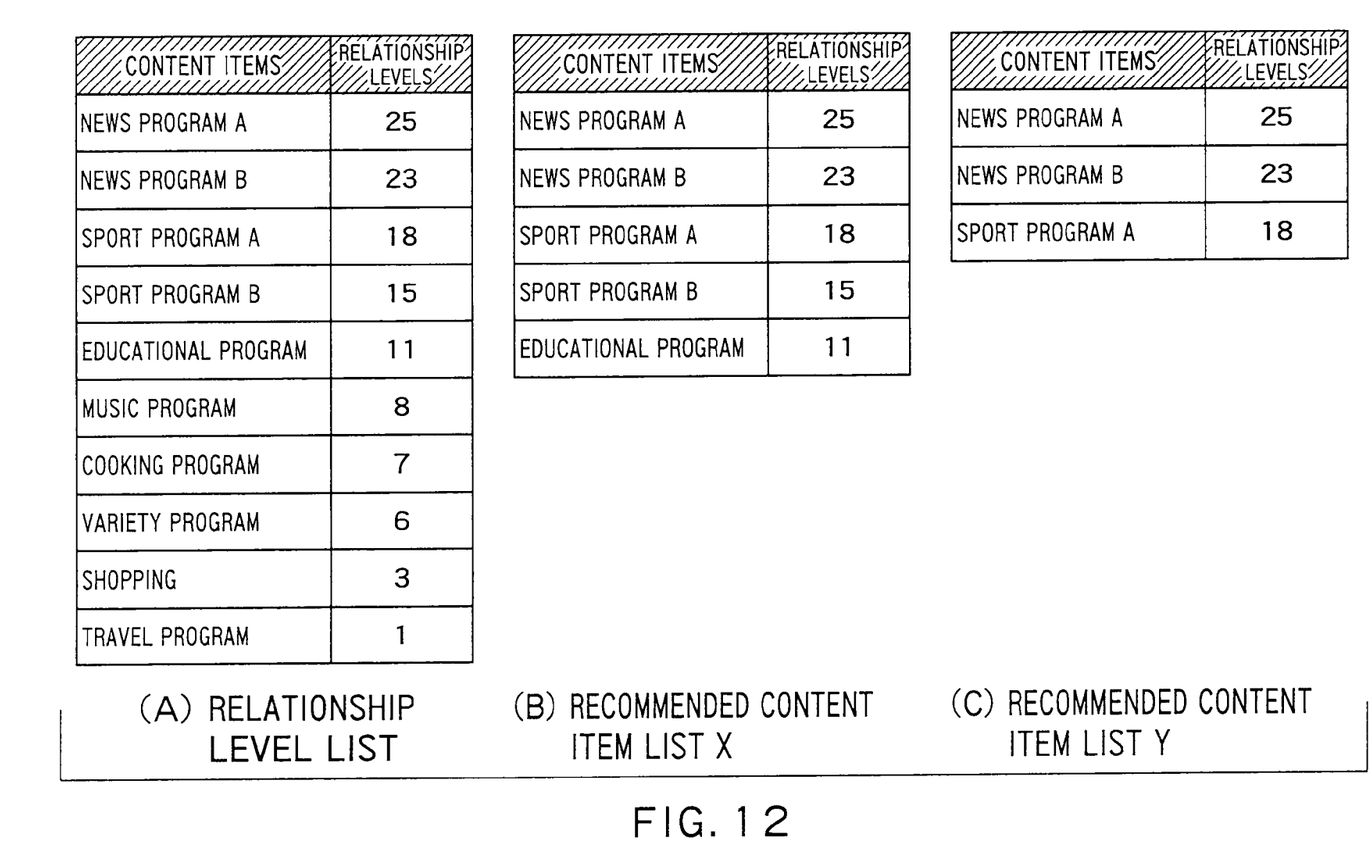
FIG. 12 is a diagram explaining an example for selecting the recommended content items according to the first embodiment.

FIG. 12 is a diagram explaining a concrete example of the steps S46 and S47 (steps for creating the recommended content item list) in FIG. 5.

Assume that the secondary relative content items of the content item A are extracted and the relationship level of each of the extracted secondary relative content items is calculated as shown in FIG. 12(A). Note that the secondary relative content items are sorted in descending order of the relationship level. Here, when step S46 (policy 1) of FIG. 5 is performed while setting the threshold value at 10, for example, the recommended content item list creator 114 creates a recommended content item list X including the secondary relative content items each of which has a relationship level of 10 points or greater as shown in FIG. 12(B). Further, when step S47 (policy 2) of FIG. 5 is performed while setting the predetermined number at 3, for example, the recommended content item list creator 114 creates a recommended content item list Y including the top three secondary relative content items as shown in FIG. 12(C).

As stated above, in the content item recommendation device according to the embodiments of the present invention, content items can be recommend to a user without using the viewing histories of the other users by using the information of the resources used in the content items.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

What is claimed is:

1. A content item recommendation device including a computer with a processor, comprising:
a storage configured to store a plurality of content item information for a plurality of content items each reproduced by using a plurality of resources, each content item information including identifiers of resources used in each content item and usage characteristics of the resources, and the content item information being obtained by analyzing script files for reproduction of the content item;
a receiver configured to receive an identifier of a specified content item;
a first specifying unit configured to specify first content items each of which uses at least S number (S is an integer of 1 or more) of resources in common with the specified content item, based on the content item information obtained by accessing the storage;

a second specifying unit configured to specify second content items each of which uses at least K number (K is an integer of 1 or more) of resources in common with at least one of the first content items, the second content items being specified from remaining content items except the specified content item and the first content items from among the content items, based on the content item information obtained by accessing the storage;

a relationship level calculator configured to calculate relationship levels between the specified content item and each of the second content items based on usage characteristics of target resources used in each of the second content items, the target resources being all resources used in common with said at least one of the first content items which uses said at least K number of resources in common;

a selector configured to select recommended content items from among the second content items based on the relationship levels of the second content items; and an output unit configured to output a list of the recommended content items.

2. The device according to claim 1,
wherein the script files have a layer structure in which a script file of an upper layer calls a script file of a lower layer,
wherein the storage stores layer levels of the resources used in each of the content items as the use characteristics, and
wherein the relationship level calculator calculates the relationship levels with respect to the specified content item based on the layer levels of the target resources used in each of the second content items.

3. The device according to claim 2,
wherein point values are set for each layer level of the layer structure, and
wherein the relationship level calculator calculates the relationship levels in accordance with totals of the point values set for the layer levels of the target resources used in each of the second content items.

4. The device according to claim 1, wherein the relationship level calculator calculates the relationship levels with respect to the specified content item by further using usage characteristics of the target resources used in the at least one of the first content items.

5. The device according to claim 4,
wherein each of the script files defines a plurality of screen effects applied to the resources when being reproduced,
wherein the storage stores values of the screen effects applied to the resources used in each of the content items, as the use characteristics, and
wherein the relationship level calculator calculates the relationship levels with respect to the specified content item by whether each value of the screen effects applied to the target resources is matched or not between respective second content items and the one or plurality of the first content items.

6. The device according to claim 5,
wherein point values are set for a number or a ratio of matched effects, and
wherein the relationship level calculator calculates the relationship levels with respect to the specified content item in accordance with totals of the point values of the target resources used in each of the second content items.

7. The device according to claim 1, wherein the selector selects one or a plurality of the second content items which has the relationship level equal to or greater than a threshold value as the recommended content items.

8. The device according to claim 1, wherein the selector selects a predetermined number of the second content items in a descending order of the relationship levels as the recommended content items.

9. The device according to claim 1,
wherein the receiver receives the identifier of the specified content item from a content item reproducing device which is reproducing the specified content item, through a network, and
wherein the output unit transmits a list of the recommended content items to the content reproducing device through the network.

10. A content item recommendation method executed by a computer, comprising:
obtaining, by accessing a content item information storage, a plurality of content item information for a plurality of content items each reproduced by using a plurality of resources, each content item information including identifiers of resources used in each content item and usage characteristics of the resources, and the content item information being obtained by analyzing script files for reproduction of the content item;
specifying first content items each of which uses at least S number (S is an integer of 1 or more) of resources in common with the specified content item, based on the content item information storage;
specifying second content items each of which uses at least K number (K is an integer of 1 or more) of resources in common with at least one of the first content items, the second content items being specified from remaining content items except the specified content item and the first content items from among the content items, based on the content item information storage;
calculating relationship levels between the specified content item and each of the second content items based on usage characteristics of target resources used in each of the second content items, the target resources being all resources used in common with said at least one of the first content items which uses said at least K number of resources in common;
selecting recommended content items from among the second content items based on the relationship levels of the second content items; and
outputting a list of the recommended content items.

11. The device according to claim 1,
wherein the at least S is equal to 1.

12. The device according to claim 1, further comprising a content item information analyzer analyzing the script files upon receiving a registration request of the content item to thereby obtain the content item information including the identifiers and the usage characteristics of the resources.

13. The device according to claim 12, where the storage receives the content item information from the content item information analyzer and stores the content item information therein.

* * * * *